Aug. 2, 1938.　　　　O. L. STARR　　　　2,125,593
DRIVE ESTABLISHING MECHANISM
Filed Aug. 4, 1936　　　2 Sheets-Sheet 1
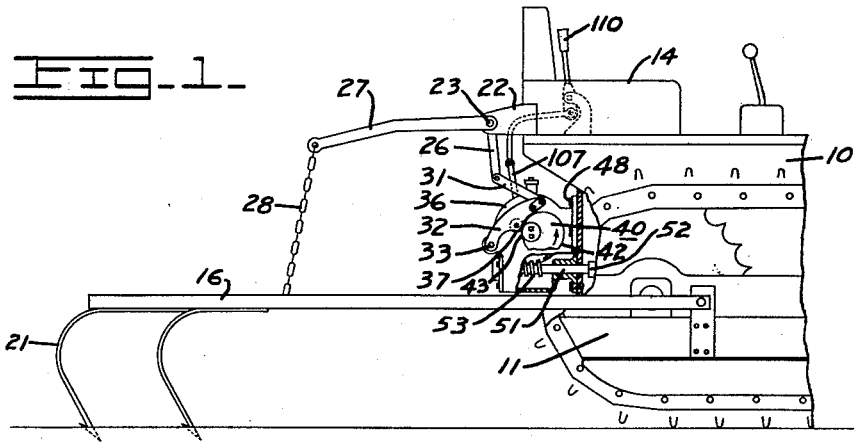
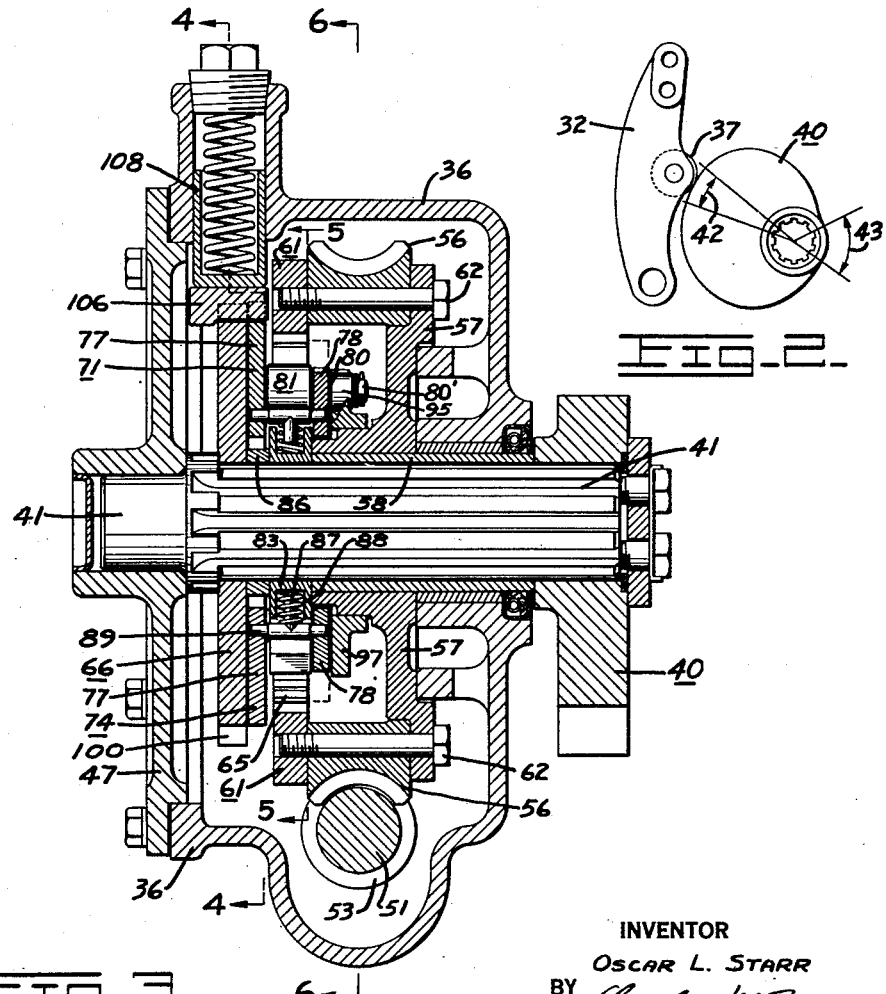
INVENTOR
OSCAR L. STARR
BY
ATTORNEY

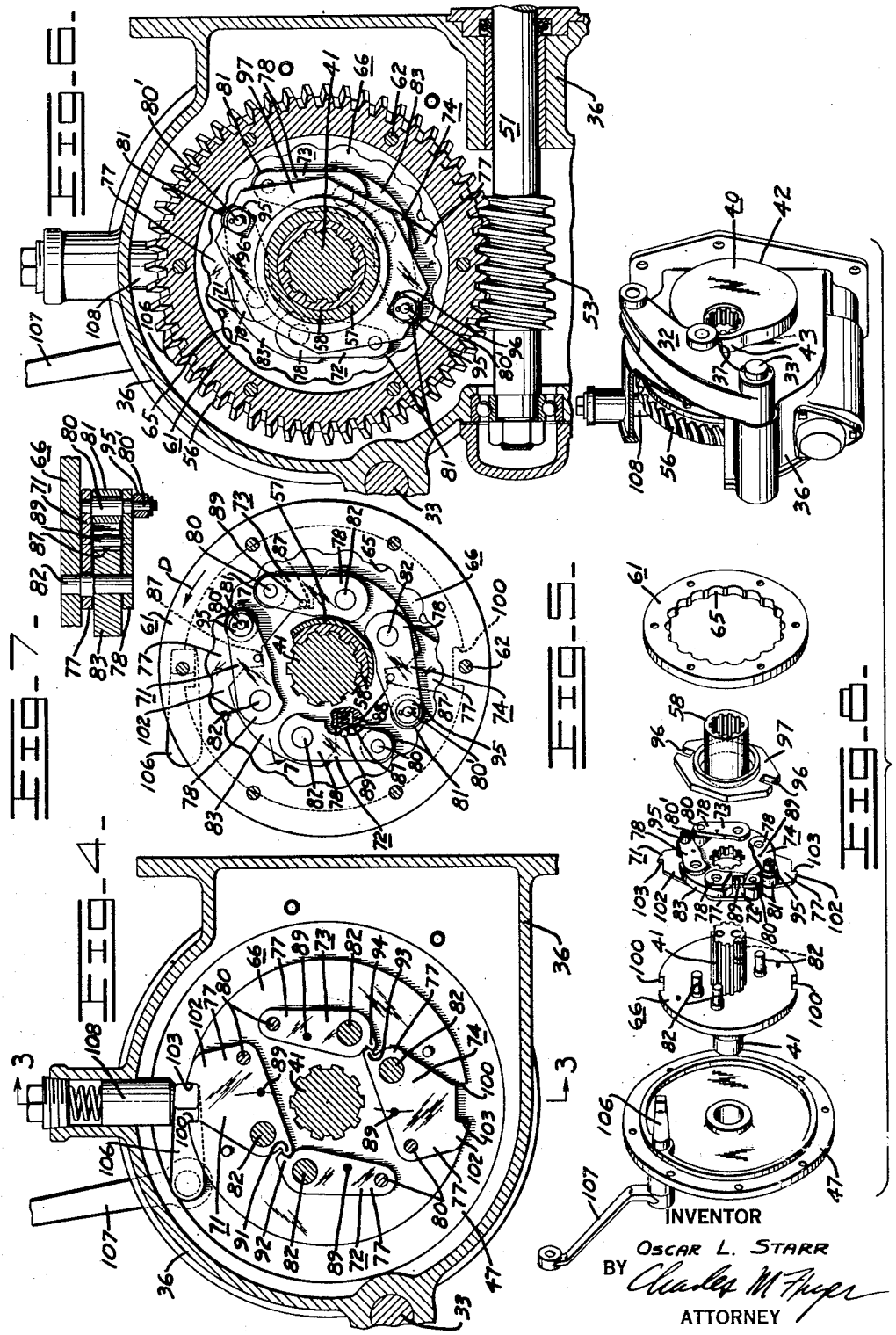

Patented Aug. 2, 1938

2,125,593

UNITED STATES PATENT OFFICE 2,125,593

DRIVE ESTABLISHING MECHANISM

Oscar L. Starr, Mission San Jose, Calif., assignor to Caterpillar Tractor Co., San Leandro, Calif., a corporation of California Application August 4, 1936, Serial No. 94,209

3 Claims. (Cl. 97—50)

My invention relates to drive establishing mechanism, and more particularly to a power operated device adapted for attachment to a machine such as a tractor, for raising or lowering an implement associated with the machine.

Power lift devices commonly used on tractors or similar power plants, comprise a one-cycle or half revolution stop clutch having a ratchet ring which is constantly rotated from a source of power through a power take-off. Engagement or disengagement of the clutch is usually effected by suitable trip mechanism which controls movable pawls adapted to engage the ratchet ring; such pawls being mounted for rotation with a rotatable pawl shaft which serves as the driven element connected to the implement or object to be moved.

When the clutch is to be engaged or disengaged to effect, respectively, movement or stopping of the object, the weight of the object is obviously transmitted to the clutch. Heretofore, during these periods, the connection between the object and the clutch permitted torsional forces or torque to be transmitted to the pawl shaft. This caused the pawls to bounce in the notches of the ratchet ring, thereby creating slippage of the pawls past the notches, with consequent chattering or vibration of the parts. As a result, the parts could only be engaged and disengaged with difficulty, and abnormal wear of the parts would occur.

Also, the power lift devices, of the character described, are merely capable of lifting the object or implement by power; lowering thereof being effected only through gravity. This is undesirable because the implement while being lowered by gravity might strike rocks on the ground which might cause damage or breakage; or if the tractor happens to be in a salesroom and is being demonstrated with the attachments thereon, the implement is apt to strike a concrete floor or similar hard surface, causing damage thereto.

My invention is designed to overcome the above described disadvantages, and has for its objects, among others, the provision of improved:

(1) Means for relieving the latching elements or pawls in power lift mechanism, of the character described, from torsional thrusts during the period when engagement or disengagement of the mechanism is being effected, to thereby avoid chattering or vibration of the parts and hence facilitate such engagement or disengagement;

(2) Power lift mechanism, of the character described, for enabling positively controlled power lowering of an object; and (3) Power lift mechanism which is of economical and simple construction, and easy to operate.

Other objects of the invention will become apparent from a perusal of the following description thereof.

In general, the power lift mechanism of my invention comprises a one-cycle or half revolution stop clutch having the usual notched ratchet ring which is adapted to be constantly driven from the power take-off of a power plant such as a tractor. The ratchet ring is mounted for rotation about a pawl shaft to which is pivotally connected latching or pawl means adapted for outward and inward movement with reference to the shaft, so as to engage and disengage the ratchet ring for establishing and interrupting the drive to the pawl shaft which is connected to the object to be moved. The pawl or latching means is so arranged as to provide a positive connection between the pawl shaft and the ratchet ring for each cycle of operation of the clutch, to thereby enable controlled power lowering of an object as well as power raising thereof.

To prevent torsional forces from being transmitted by the load of the object to the clutch, when engagement of the pawl means with the ratchet ring is being effected to establish a drive, and thereby avoid the previously pointed out undesirable chattering or vibration and facilitate engagement of the clutch, I provide means interposed between the object and the clutch which transmits only radial thrust to the clutch during the period noted, and which provides a period of comparative rest to facilitate engagement of the clutch parts. Such means includes a cam connected to the clutch and having a dwell portion of substantially true circular contour concentric with the axis of rotation of the cam, upon which portion a cam follower connected to the load is adapted to ride during the period of engagement of the clutch. Preferably, two of such dwell portions are formed in opposed relationship on said cam, to provide the same function when the clutch is either disengaged or engaged.

Reference will now be made to the drawings for a more detailed description of the invention; in the drawings:

Fig. 1 is a schematic side elevation of a rear portion of a type of tractor carrying an agricultural implement which is schematically illustrated in lowered position; the lift mechanism of my invention being shown attached to the rear of the tractor. Parts of the structure are broken away to disclose more clearly the construction.

Fig. 2 is a side elevation of portions of the mechanism disassociated from the remaining structure, and in the position they assume when the implement is raised.

Fig. 3 is a substantially vertical longitudinal section of the power lift mechanism of my invention.

Fig. 4 is a vertical section taken in a plane indicated by the line 4—4 in Fig. 3; the line 3—3 in Fig. 4 indicating the plane of section of Fig. 3.

Fig. 5 is a vertical section taken in a plane indicated by the line 5—5 in Fig. 3.

Fig. 6 is a vertical section taken in a plane indicated by the line 6—6 in Fig. 3.

Fig. 7 is a fragmentary section taken in a plane indicated by the line 7—7 in Fig. 5.

Fig. 8 is an exploded perspective view of the mechanism of my invention showing various parts thereof spread out along the axes of the rotating members, to illustrate more clearly the relationship of the various parts.

A type of power plant or tractor herein disclosed for the purpose of illustration, to which the device of my invention is attached, will now be described. Briefly, the tractor comprises a tractor body 10 and ground engaging devices 11 which support and propel the machine. The usual operator's seat 14 is provided adjacent the rear portion of the tractor; and an implement 16, which may be of any suitable type of construction, is pivotally connected to the rear of the tractor adjacent seat 14. Suitable earth working tools such as cultivators 21 are included in the implement.

Journalled in suitable apertures in rearwardly extending brackets 22 (only one being shown in Fig. 1), secured to the rear portion of the tractor body, is a transversely extending rock shaft 23 having fixedly secured thereto downwardly depending arm 26 and rearwardly extending arm 27 which is connected to the implement in any suitable manner such as by chain 28. It is to be noted that oscillation of arm 26 will cause rearwardly extending arm 27 to oscillate in substantially a vertical plane, thereby raising or lowering the implement with relation to the ground. Downwardly depending arm 26 is connected by link 31 (Fig. 1) to one end of actuator or cam-follower lever 32 suitably pivoted adjacent its other end on shaft 33 fixedly secured in casing 36 of the lift device. Casing 36 is detachably secured to the rear of the tractor, and contains therein controllable clutching mechanism which will be hereinafter described.

Lever 32 has journalled thereon, intermediate its ends, cam-follower roller 37 which engages the periphery of cam 40 splined for rotation with driven shaft 41 journalled in casing 36. The periphery of cam 40 is provided with substantially diametrically opposite portions or dwells 42 and 43 (Fig. 2) of substantially circular contour concentric with the axis of rotation of driven shaft 41, for a purpose to be later explained. Rotation of cam 40 causes oscillation of lever 32 which through the previously described connection to the implement, causes the implement to be raised or lowered. It is to be noted at this point that the weight or load of the implement always acts upon cam-follower lever 32, in such a direction as to hold roller 37 against the periphery of cam 40.

The drive establishing means provided in casing 36 for rotating cam 40 by power will now be described. Casing 36 has side cover 47, and is secured to the rear face of the tractor in any suitable manner, such as by cap screws 48 (Fig. 1). Journalled in the lower part of the casing is a shaft 51 which is connectable in any well-known manner to constantly driven power take-off shaft 52 which forms part of the tractor transmission and is suitably driven in any conventional manner from the tractor engine (not shown). Worm 53 fixed to shaft 51 engages worm wheel 56 mounted on flange 57 journalled for rotation about sleeve 58 (Fig. 3) splined to driven shaft 41. A ratchet ring 61 mounted adjacent one side of worm wheel 56, is provided with threaded apertures in which are engaged suitable screws 62 extending through flange 57 and worm wheel 56, thereby securing ring 61, worm wheel 56 and flange 57 together to thus form the driving means of a half revolution or one-cycle stop clutch. A series of internal scalloped notches or recesses 65 are formed upon ratchet ring 61 for a purpose to be hereinafter explained.

The driven means of the clutch includes a disc 66 splined to driven shaft 41 for rotation therewith, and a plurality of pawls 71, 72, 73 and 74 which are secured for rotation with shaft 41 and mounted for inward and outward movement with respect to such shaft for effecting positive driving engagement with ratchet ring 61 and disengagement from the ring. Each of the pawls is formed of a pair of spaced links 77 and 78 which are secured at their outer ends by pin 80 having clutch roller 81 journalled thereon. At their inner ends, each pair of links 77 and 78 is pivoted for movement upon pin 82 secured to disc 66 and extending through an aperture in spider 83 which is splined to driven pawl shaft 41 for rotation with such shaft; a suitable spacer 86 being interposed between disc 66 and spider 83 to provide for accommodation of the links 77 between these parts.

Resilient means is provided which serve to urge the pawls in an outward direction to effect driving engagement of the rollers 81 in the notches 65 of ratchet ring 61. For this purpose, a spring 87 is provided for each pawl; the inner end of such spring being seated in aperture 88 in spider 83. The outer end of each spring 87 contacts a pin 89 journalled between the links 77 and 78. With reference to Fig. 5, it will be noted that the pawls are arranged in sets or pairs 71, 74, and 72, 73; the pawls of each set being diametrically opposite each other and extending in opposite tangential directions with reference to the axis of rotation of shaft 41.

When the pawls are resiliently pressed with their rollers 81 in engagement with associated notches in ring 61, a drive can be established from the driving shaft 51 to the driven shaft 41 which, as previously explained, effects rotation of cam 40 to raise or lower the implement. The pawls are all adapted to be engaged in the notches 65 at the same time by trip control means (hereinafter described) which act to maintain such engagement for only a half revolution of the clutch so that the implement may be either raised or lowered by power during a half revolution of movement of the clutch. In this connection, it is to be noted that when all the rollers of the pawls are engaged and the implement is in position to be raised, the diametrically opposite pawls 71 and 74 (Fig. 5) will carry the load; the direction of rotation of ratchet ring 61 being indicated by arrow D.

However, under the same circumstances when the implement is to be lowered from raised position, the diametrically opposite pawls 72 and 73 will carry the load because then driven shaft 41 has a tendency to be rotated faster than ratchet ring 61, due to the weight of the implement being lowered; and this tends to cause shaft 41 to overrun ring 61 and cause disengagement of pawls 71 and 74 from ring 61. At the same time, such action tends to wedge the diametrically opposite pawls 72 and 73 in tight engagement with ring 61. Thus, it is seen that one set of pawls provides means for maintaining positive engagement of the clutch during raising of the implement, while the other set performs this function during lowering of the implement. In prior constructions with which I am familiar, only one set of pawls was heretofore provided for raising an implement. These pawls could not serve to maintain engagement of the clutch during lowering of the implement, because of the weight of the implement which tends to pull the pawls out of engagement, in the manner explained.

The control means for effecting engagement of the pawls with ring 61 and for effecting automatic disengagement at the end of each half revolution of the ring will now be described. Links 77 (Fig. 4) of pawls 71 and 72 are at one side of spider 83, and have ears 91 and 92 engaging each other so that any inward movement of pawl 71 will cause a like movement of pawl 72. The links 77 of pawls 73 and 74 are likewise provided with similar interengaging ears 93 and 94, to enable inward movement of pawl 74 to be transmitted to pawl 73. Journalled upon projecting portions 80' (Fig. 7) of pins 80 located in the outer ends of the set or pair of pawls 71, 74 are rollers 95 which engage diametrically oppositely spaced notches 96 formed in interlocking plate 97 (Fig. 6) which is journalled upon an enlarged portion of the hub of flange 57. Thus, any inward movement of pawl 71 is transmitted to pawl 74 by means of interlocking plate 97; and since pawls 71 and 74 control the inward movement of pawls 72 and 73, respectively, any inward movement of either pawl 71 or 74 will cause a corresponding simultaneous movement of the other three pawls, against the action of the resilient means 87, which serves to thrust all the pawls outwardly into engagement with ratchet ring 61 to establish a drive and carry load during both the lifting and lowering operations. The plate 97 and ears 91, 92 and 93, 94, hence, serve as interlocking or connecting means for effecting simultaneous movement of the pawls against the action of the resilient means 87.

Normally, when the drive establishing means or clutch is disconnected, the pawls are held inwardly against the action of the resilient means 87. For this purpose, the periphery of driven disc 66 is provided with notches 100 at diametrically opposite points; and upon the links 77 of diametrically opposite pawls 71 and 74, are outwardly extending wings 102 having recesses 103 which have the same diametrically opposite positions as notches 100. The pawls are held inwardly out of engagement with ratchet ring 61 by means of trip latch lever 106 connected to control linkage 107; lever 106 being resiliently engaged in a notch 100 and associated recess 103, by spring pressed plunger 108 slidably mounted in casing 36.

When it is desired to establish the drive for either raising or lowering the implement, trip latch lever 106 is momentarily disengaged from a notch 100 and the associated recess 103, through operation of linkage 107 by control handle 110 at operator's station 14. This results in the resilient means 87 thrusting the pawls outwardly, immediately into engagement with rotating ratchet ring 61, to cause rotation of driven shaft 41, spider 83 and disc 66, as a unit. During such rotation, trip latch lever 106 will ride on the periphery of disc 66, for a distance extending between the diametrically opposite notches 100, or in other words, a distance corresponding to one half revolution of the clutch. Upon rotation of disc 66 and spider 83 to the point where they present the opposite notch 100 and associated recess 103 to trip latch lever 106, the lever will enter therein through the action of spring pressed plunger 108, to effect simultaneous inward movement of the pawls and immediate disengagement thereof from ratchet ring 61. Thus, for each tripping of lever 106, the clutch will be caused to rotate only a half revolution to either raise or lower the implement by power, in the manner previously described.

During the time disengagement of the trip latch lever 106 is being effected to allow the pawls to engage the ratchet ring 61, or during the period engagement thereof is being effected to cause disengagement of the pawls from the ratchet ring 61, it is apparent that if the load of the implement could be transmitted torsionally to the shaft 41 and consequently the clutch, this would tend to cause shaft 41 to rotate at a different speed than ring 61. As a result, during these periods when engagement or disengagement of the pawls were being effected, by inward or outward movement relative to ratchet ring 61, they would tend to bounce in and out of the notches in the ratchet ring which would cause chattering of the parts and consequently abnormal wear thereof. Also, during these periods, disengagement or engagement of the pawls from or with the ratchet ring could only be accomplished with difficulty.

However, with the construction of my invention, the diametrically opposite dwell portions 42 and 43 on cam 40, which are so positioned as to engage the cam-follower roller 37 during the periods when the pawls are in the act of being both engaged or disengaged from the ratchet ring either when the implement is to be lifted or lowered and which are of substantially true circular contour substantially concentric with the axis of rotation of cam 40, serve to prevent the load of the implement from transmitting torsional forces or torque to shaft 41 during such periods, to thereby prevent the undesirable chattering which would otherwise occur due to relative rotatable movement between the driving and the driven parts of the clutch, resulting from application of torque to shaft 41. In other words, such dwell portions facilitate engagement or disengagement of the pawls by providing a comparative period of rest for the driven shaft 41 during such periods.

These conditions obtain because when the cam-follower roller 37 contacts the circular portions 42 and 43 of the cam, only radial thrusts or forces are transmitted to driven shaft 41 by the load, and the load cannot be lifted or lowered during the periods when roller 37 rides on cam portions 42 or 43. Such radial forces obviously do not tend to create relative rotatable movement between the pawl means associated with driven shaft 41 and the ratchet means which forms part of the driving means of the clutch. The portions between the circular dwell portions 42 and 43 of the cam, can obviously be made of any suitable contour, to provide desired rates of acceleration for lowering or raising of the implement.

From the preceding description, it is seen that I have provided a half revolution or one-cycle stop clutch which serves to both lower the load by power, as well as to raise it by power. This obviates possible breakage of the implement which might otherwise be caused if the implement were lowered by gravity and thereby strike hard objects on the ground, or strike a hard surface such as a concrete floor upon which the tractor might be standing. Also, the dwell portions 42 and 43 on cam 40 serve to prevent torsional load forces from being transmitted to the clutch during the periods when the pawl means is being engaged with or disengaged from the ratchet means, to thereby prevent the load from interfering with engagement and disengagement of these parts and thus insure facile engagement and disengagement thereof.

I claim:

1. Mechanism adapted for attachment to a tractor for effecting both raising or lowering of an implement by power, comprising a drive establishing device including a rotatably mounted ring having a series of notches, a rotatably mounted shaft about which said ring is rotatable, pawl means mounted for rotation with said shaft for engaging a notch of said ring to establish a drive and carry load when the implement is being raised, and additional pawl means mounted for rotation with said shaft for engaging a notch of said ring to establish a drive and carry load when the implement is being lowered; a cam-follower adapted for connection with said implement; and a cam connected for rotation by said shaft and upon which said cam-follower is adapted to ride; said cam having opposite circumferential portions substantially concentric with the axis of rotation of said shaft for preventing the load of said implement from causing chattering of said pawl means during the periods when engagement with or disengagement from said ring is being effected.

2. Mechanism adapted for attachment to a tractor for effecting raising or lowering of an implement by power comprising a one-cycle stop clutch including a rotatably mounted ring having a series of notches, a rotatably mounted shaft about which said ring is rotatable, a set of pawls mounted for rotation with said shaft and pivotally connected thereto for inward movement and outward movement with reference to said shaft for engaging notches of said ring to establish a drive and carry load when the implement is being raised, another set of pawls mounted for rotation with said shaft and pivotally connected thereto for inward movement and outward movement with reference to said shaft for engaging notches of said ring to establish a drive and carry load when the implement is being lowered, and mechanism interconnecting all of said pawls for simultaneous movement.

3. Mechanism adapted for attachment to a tractor for effecting raising or lowering of an implement by power comprising a one-cycle stop clutch including a rotatably mounted ring having a series of notches, a rotatably mounted shaft about which said ring is rotatable, a set of pawls mounted for rotation with said shaft and pivotally connected thereto for inward movement and outward movement with reference to said shaft for engaging notches of said ring to establish a drive and carry load when the implement is being raised, another set of pawls mounted for rotation with said shaft and pivotally connected thereto for inward movement and outward movement with reference to said shaft for engaging notches of said ring to establish a drive and carry load when the implement is being lowered, resilient means for urging said pawls outwardly into engagement with said ring, means connecting a pawl of one set with a pawl of another set for simultaneous inward movement, means connecting a second pawl of said one set with a second pawl of said another set for simultaneous inward movement, means connecting pawls of the same set for simultaneous inward movement whereby all of said pawls are interconnected for simultaneous inward movement, and means for holding said pawls inwardly out of engagement with said ring.

OSCAR L. STARR.